Figure 1:
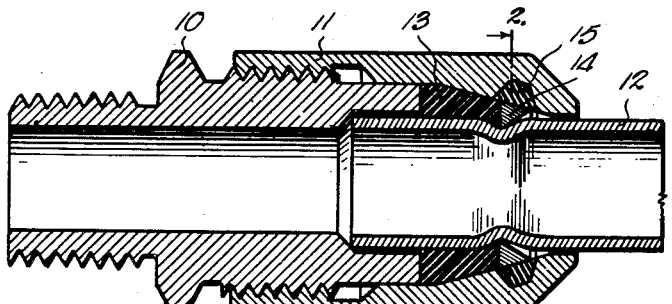

March 29, 1949.                 J. F. STEPHENS                 2,465,972
                                 TUBE COUPLING
                              Filed April 27, 1945

INVENTORS.
Joseph F. Stephens
BY
ATTORNEY

Patented Mar. 29, 1949

2,465,972

UNITED STATES PATENT OFFICE 2,465,972

TUBE COUPLING

Joseph F. Stephens, Kansas City, Mo., assignor to Gustin-Bacon Manufacturing Company, a corporation of Missouri Application April 27, 1945, Serial No. 590,538

10 Claims. (Cl. 285—90)

This invention relates to improvements in couplings and refers more particularly to flexible couplings or joints for connecting plain end tubing, pipes, or conduits used in transferring fluids.

The couplings are particularly adapted for use in joining tubing employed in systems where fluids are under high pressure as in the hydraulic systems of aircraft, machine tools, automobiles, trucks and military tanks and other types of military ordnance.

The principal difficulty and problem encountered with joints or couplings used for the above purposes are the vibrational and end-pull stresses to which the pipe or tubing is subjected. The tubing is assembled in these systems by screw threaded fittings which must be secured to the tubing at the joints in a manner that will insure a pressure-tight seal without unduly distorting the tubing.

Many different types or designs of couplings have been proposed and used in such systems, some requiring preliminary preparation of the tube end such as flaring and beading of the tube. Other designs employ the swedging on of ferrules or metal rings near the ends of the tubes with which may or may not be used distortable rubber gaskets.

The instant invention has to do with a coupling which may employ any suitable type of fittings in which is formed an annular chamber about the peripheral surface of the tubing near the end where the joint is to be made. As sealing members to assure a pressure-tight joint between the parts to be joined and tubing there is located within the annular space or chamber formed a distortable gasket and a hard relatively rigid split grooving ring. In one type the grooving ring is constricted by a bevelled camming surface formed on the interior surface of one of the fitting members. A modification of this type incorporates a cushioning ring inset within the fitting and encircling the grooving ring. A second modification employs a distortable gasket and split grooving ring arranged side by side on the peripheral surface of the tube with a cam sleeve encircling the gasket and grooving ring and a distortable cushioning sleeve or ring outside of the cam sleeve. In all of the different designs the primary purpose is to obtain a pressure-tight seal at the tube end and one which is capable of withstanding vibrational and end-pull stresses to which the joint may be subjected.

An object of the invention, therefore, is to provide a flexible coupling or joint for tubing which will withstand vibrational and end-pull stresses over considerable periods of time without failure.

Another object is to provide a joint which is easily made without flaring the ends of the tube or preliminarily preparing the tube with special tools which may not be available when the joint is to be made.

A further object is to provide a coupling which depends for its seal upon both a distortable gasket and a grooving ring affording flexibility not obtained in a metal to metal joint where the tube is gripped solely by the fitting members.

Other and further objects of the invention will appear from the following description.

Figure 2:
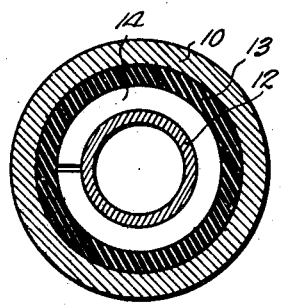
Figure 3:
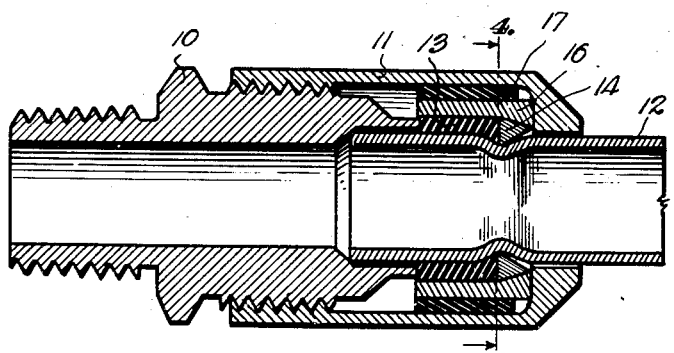
Figure 4:
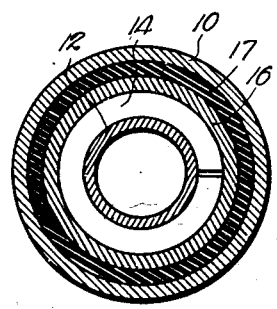
Figure 5:
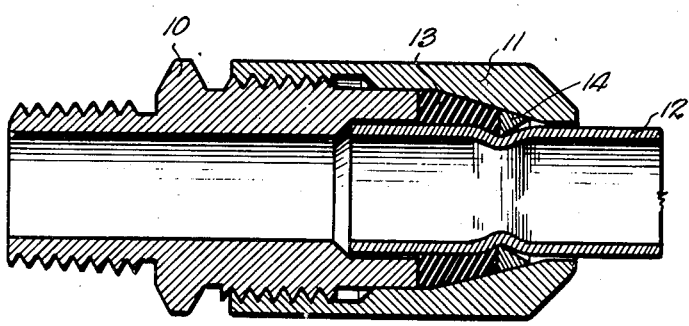

In the accompanying drawings which form a part of the specification and are to be read in conjunction therewith, and in which the same reference numerals are used to indicate the same parts in the various views, Fig. 1 is a sectional view of a coupling embodying one concept of the invention, Fig. 2 is a sectional view taken along the line 2—2 in Fig. 1 in the direction of the arrows, Fig. 3 is a sectional view of a modified type of construction, Fig. 4 is a view taken along the line 4—4 in Fig. 3 in the direction of the arrows, Fig. 5 is a sectional view of a second modification.

Referring to the coupling shown in Figs. 1 and 2 of the drawings, the fitting members comprise a nipple 10 which is screw-threaded to receive compression nut 11. In the end of the nut is an aperture through which the end of tubing 12 is inserted. The nipple and compression nut when screwed together surround the end of the tube and form an annular space or chamber about the peripheral surface of the tube near its end. Within this space or chamber is a distortable gasket 13 and a split grooving ring 14. The gasket and grooving ring are positioned side by side on the outer peripheral surface of the tubing. The grooving ring is preferably triangular ni cross section with one edge of the ring lying against the surface of the tube and the outer flat surface of the ring in contact with the inner surface of a cushioning ring 15 inset in a groove or trough formed in the compression nut. The split grooving ring is of a solid, hard substance, preferably metal, which will indent a groove in the tubing when constricted upon tightening of the fittings. Constriction of the grooving ring results from the camming effect produced by the contacting bevelled surfaces of the grooving ring and cushioning ring. The cushioning ring is formed of resilient material such as rubber or synthetic rubber and, since it furnishes a backing for the grooving ring, gives the ring and joint a cushioning action which supplements the resiliency furnished by the sealing gasket 13. Assembly of the joint is simple, since all that is necessary to make the coupling is to slip the compression nut onto the end of the tubing, insert the grooving ring and gasket on the tubing and slide the compression nut against the grooving ring and gasket, the cushioning ring 15 being a part of the compression nut. When the compression nut is screwed onto the nipple the bevelled inner surface of the cushioning ring constricts the grooving ring indenting a groove in the tubing andn forming an effective seal between the tubing and compression nut. At the same time the bevelled inner surface of the compression nut distorts the gasket 13 whose shape is made to conform with the surfaces of the annular chamber within the tube fittings producing a resilient pressure-tight seal between the fittings, tubing and grooving ring.

In the modification shown in Figs. 3 and 4, the fittings 10 and 11 are the same as before. The gasket 13 and grooving ring 14 are located within the annular chamber formed by the fittings, as before. In this modification cushioning ring 15 is replaced by a cam ring or sleeve 16 and a resilient cushioning ring or sleeve 17, the latter encircling the former and the cam sleeve encircling the gasket and grooving ring. The cam sleeve has a bevelled surface which conforms with and fits against the outer periphery of the grooving ring in such manner as to constrict the grooving ring when the compression nut is tightened in making the joint. To assemble this coupling the compression nut is slipped onto the end of the tubing. The cam sleeve 16 and cushioning ring 17 which encircle it is put onto the end of the tubing as a unit after which the grooving ring and gasket are inserted within the cam sleeve. When the sealing members are properly located near the end of the tubing, compression nut 11 is screwed onto the male portion of the fitting or nipple 10. As the compression nut is tightened the bevelled portion of the cam sleeve constricts the grooving ring causing the ring to groove the tubing slightly and grip the tube firmly against possibility of end-pull displacement. At the same time the distortable gasket 13 is deformed to tightly fit and seal the chamber between the grooving ring, tubing, inner surface of the cam sleeve and end of the fitting 10. The cushioning ring 17 is swedged between the compression nut and cam sleeve and lends its resiliency to the joint.

In the modification shown in Fig. 5, constriction of the split grooving ring is accomplished by the bevelled inner camming surface of the compression nut. In this modification alone the split grooving ring is constricted and backed by the rigid bevelled camming surface of the compression nut. The distortable gasket 13, as in the previous types, seals the walls of the annular chamber formed by the fittings around the tubing and against a surface of the grooving ring.

It will be obvious from the construction of the coupling as shown in the various views that the constriction of the grooving ring produces a relatively rigid connection between the fittings and tubing. The gripping of the grooving ring eliminates possibility of failure of the joint due to end-pull. The distortable gasket assures a seal at the walls of the annular chamber and the outer surface of the tubing, as well as against the end of the male fitting member. The cushioning rings shown in Figs. 1 to 4, inclusive, give additional resiliency to the joint and supplement the cushioning effect of the distortable gasket.

It is contemplated that the different types of couplings disclosed may be used upon aluminum, copper, steel, plastics, or tubing of other materials where pressure-tight joints are essential. The tube fittings surrounding the tube ends and forming the enclosure for the sealing members of the joint may be a nipple and compression nut as shown, an elbow, a T-connection, a union or any conventional type of tube fitting. The distortable gaskets are preferably of rubber or synthetic rubber, as are the cushioning rings. The split grooving rings are preferably of metal or of a solid, rigid material sufficiently hard to groove the surface of the tube when the fittings are tightened.

While it is believed that the principal use of the couplings described are for thin wall tubes, they may be used as well on connections for pipe, metallic or non-metallic, in sizes and wall thicknesses considerably greater than that normally encountered in tubing.

From the foregoing it will be seen that the invention is well adapted to attain the ends and objects hereinbefore set forth, together with other advantages which are obvious and which are inherent to the couplings. As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A coupling for plain end tubing comprising relatively movable interengaging elements surrounding the tube end where the joint is to be made, said elements forming an annular chamber about the peripheral surface of the tube and being adapted, upon movement relative to one another, to decrease the size of said chamber, sealing members in the chamber comprising a distortable gasket and a rigid split grooving ring each encircling the tube, said grooving ring positioned beside the gasket on the tube surface and adapted, responsive to a decrease in the size of said chamber, to contract into gripping relationship with the tube surface under the influence of said distortable gasket, and a cushioning ring of resilient material in the chamber encircling the split ring.

2. A coupling as in claim 1 in which contacting surfaces between the outer periphery of the grooving ring and one of the interengaging elements constitute bevelled camming surfaces adapted to constrict the diameter of the ring and groove the tube beneath the ring upon tightening of said elements.

3. A coupling for plain end tubing comprising relatively movable interengaging elements surrounding the tube end where the joint is to be made, said elements forming an annular chamber about the peripheral surface of the tube and being adapted, upon movement relative to one another, to decrease the size of said chamber, sealing members in the chamber comprising a distortable gasket and a rigid split grooving ring each encircling the tube, said grooving ring positioned beside the gasket on the tube surface, an inset ring of resilient material between the grooving ring and interengaging elements, said inset ring and grooving ring having bevelled contacting surfaces whereby tightening of the elements constricts the grooving ring and cushions the ring in the resilient material.

4. A coupling as in claim 1 in which sealing members comprise a distortable gasket and split grooving ring arranged side by side on the periphery of the tube, a resilient caming ring encircling the grooving ring, bevelled contacting surfaces between the grooving ring and caming ring whereby tightening of the interengaging elements constricts the grooving ring and cushions the ring in the resilient material.

5. A coupling as in claim 1 in which the sealing members comprise a distortable gasket and split grooving ring arranged side by side on the periphery of the tube, a caming ring encircling the gasket and grooving ring, bevelled contacting surfaces between the grooving ring and caming ring, said resilient cushioning ring being disposed between the caming ring and interengaging elements whereby tightening of the elements constricts the grooving ring and cushions the sealing elements in the resilient material of the gasket and cushioning ring.

6. A joint for plain end tubing comprising a split ring encircling the end of the tube and a sleeve encircling said ring, said sleeve having a tapered bore for at least part of its length and said ring being tapered externally to mate with said bore, the axial dimension of said ring being less than the axial length of the tapered bore, means for advancing said sleeve axially of the tube to cause the tapered bore of the sleeve to apply a force to the tapered exterior of the split ring, an annular gasket of elastic material encircling the tube adjacent the split ring and having its outer periphery in engagement with the tapered bore, said gasket resisting any advance of the split ring axially of the tube upon said application of force thereto, whereby said force causes the split ring to contract into gripping relationship with the tube.

7. A joint as claimed in claim 6 wherein the tube-engaging portion of the split ring comprises an annular knife edge.

8. A joint for plain end tubing comprising a split ring and another ring encircling the tube at spaced-apart points, a sleeve encircling said rings and forming with them and the tube an enclosed annular chamber, a sealing mass of yielding elastic material substantially filling said chamber, said sleeve being tapered internally and said split ring being tapered externally to coact therewith, means for moving said sleeve axially of the tube relative to said other ring thereby to cause the tapered interior of the sleeve to apply to the split ring a force tending to reduce its diameter, and an annular cushion encircling the split ring to resiliently support same.

9. A joint for plain end tubing comprising a split ring and another ring encircling the tube at spaced apart points, a sleeve encircling said rings and forming with them and the tube an enclosed annular chamber, a sealing mass of yielding elastic material substantially filling said chamber, said sleeve being tapered internally and said split ring being tapered externally to coact therewith, means for moving the sleeve axially of the tube relative to the other ring thereby to cause the tapered interior of the sleeve to apply to the split ring a force tending to reduce its diameter, said ring being triangular in radial cross section with the side adjacent the elastic sealing material substantially perpendicular to the axis of the ring and the opposite side oblique to said axis to form a knife edge engaging the tube.

10. A joint as in claim 9 having an annular cushioning ring of resilient material encircling the sleeve, and an annular collar encircling the cushioning ring to resiliently support said sleeve.

JOSEPH F. STEPHENS.

REFERENCES CITED

The following references are of record in the file of this patent:

UNITED STATES PATENTS

| Number | Name | Date |
| --- | --- | --- |
| 1,063,926 | Schuermann | June 3, 1913 |
| 2,182,811 | Kocher | Dec. 12, 1939 |
| 2,255,673 | McDermott | Sept. 9, 1941 |
| 2,358,408 | McMurray | Sept. 19, 1944 |

FOREIGN PATENTS

| Number | Country | Date |
| --- | --- | --- |
| 268,162 | Great Britain | Mar. 31, 1927 |